Sept. 23, 1958     R. L. BEYERSTEDT     2,852,869
POWER LOADER AND BULLDOZER
Filed Sept. 15, 1954     6 Sheets-Sheet 1
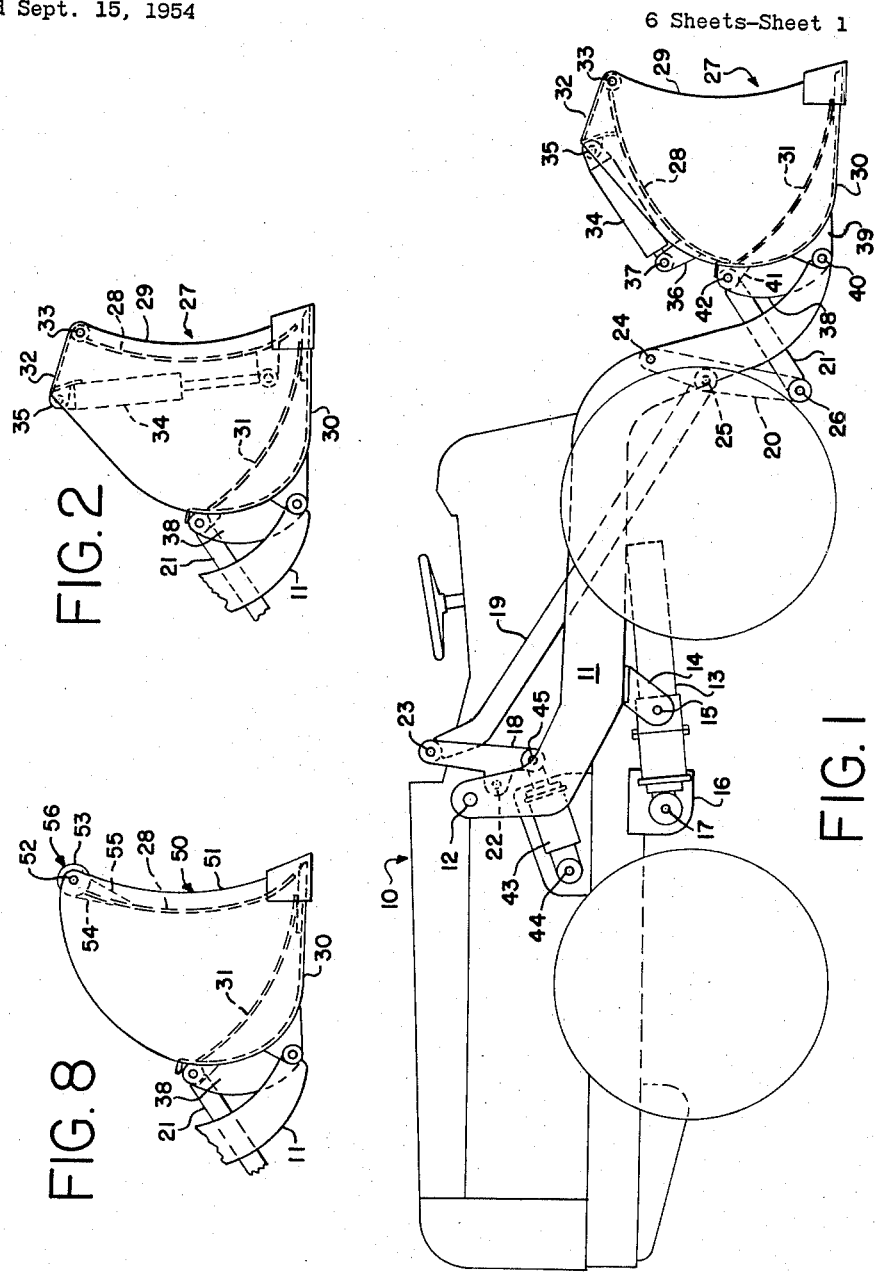
*INVENTOR.*
RALPH L. BEYERSTEDT
BY Paul O. Pippel
ATTORNEY Sept. 23, 1958     R. L. BEYERSTEDT     2,852,869
POWER LOADER AND BULLDOZER Filed Sept. 15, 1954                                                       6 Sheets-Sheet 2

*INVENTOR.*
RALPH L. BEYERSTEDT
BY Paul O. Pipper

ATTORNEY

Sept. 23, 1958 R. L. BEYERSTEDT 2,852,869
POWER LOADER AND BULLDOZER
Filed Sept. 15, 1954 6 Sheets-Sheet 3

INVENTOR.
RALPH L. BEYERSTEDT
BY Paul O. Pippel
ATTORNEY

Sept. 23, 1958  R. L. BEYERSTEDT  2,852,869
POWER LOADER AND BULLDOZER
Filed Sept. 15, 1954  6 Sheets-Sheet 4

INVENTOR.
RALPH L. BEYERSTEDT
BY Paul O. Pippel
ATTORNEY

Sept. 23, 1958     R. L. BEYERSTEDT     2,852,869
POWER LOADER AND BULLDOZER

Filed Sept. 15, 1954     6 Sheets-Sheet 5

*INVENTOR.*
RALPH L. BEYERSTEDT
BY *Paul O. Pippel*

ATTORNEY

INVENTOR.
RALPH L. BEYERSTEDT

United States Patent Office 2,852,869
Patented Sept. 23, 1958

2,852,869

POWER LOADER AND BULLDOZER

Ralph L. Beyerstedt, Libertyville, Ill., assignor to The Frank G. Hough Co., a corporation of Illinois Application September 15, 1954, Serial No. 456,169

25 Claims. (Cl. 37—117.5)

This invention relates generally to front end power loaders, and more specifically to novel bucket arrangements for front end power loaders.

As is well known in the art, front end power loaders are generally comprised of prime movers such as a rubber tired or crawler tractor, a bucket disposed forwardly of the prime mover, and boom and linkage means operatively interconnecting the bucket and the prime mover. Various means have been provided, under control of the operator of the loader, for operating the boom and linkage means to in turn control the various necessary operations of the bucket such as digging, carrying, dumping, bulldozing, spreading and backfilling of any material commonly worked by such a loader.

Power loaders, as now known in the art, are not capable of performing all of the noted functions with the desired or with substantially equal efficiency. Among the most troublesome functions, which have resulted in decreased overall efficiency of power loaders, have been the functions of dumping, backfilling, spreading and bulldozing. The dumping function is often poorly performed since when sticky materials are worked there is a tendency of the material to adhere to the inner walls of the bucket when the bucket is operated to the dump position. Further, the dumping height and reach is often considerably reduced when the bucket is pivoted about its lower rear portion to the dump position, as is common in the art. The spreading and backfilling functions are often poorly performed since bucket means commonly known in the art do not permit gradual and efficient dumping of a material at ground level. The function of bulldozing is often poorly performed since the buckets generally known in the art cannot be adjusted to present an ideal bulldozing blade surface to the material to be worked. Additionally, it may be noted that bucket arrangements commonly known in the art do not permit efficient digging of any material below ground level. Therefore, it is the object of this invention to provide a bucket arrangement for a front end power loader which will efficiently perform all of the noted functions including those with which difficulty has been experienced in the art.

A feature of the present invention is the novel construction of a bucket having an ejector mechanism.

Other objects and features of the present invention will be apparent upon a perusal of the following specification and drawings, of which:

Figure 1 is a side plan view of a power loader constructed according to the present invention with the bucket in the dig position at ground level;

Figure 2 is a partial side plan view of a portion of the invention shown in Figure 1 with the bucket in another operated position;

Figure 8 is a side plan view of the bucket shown in Figure 2 with different operating means;

Figure 3:
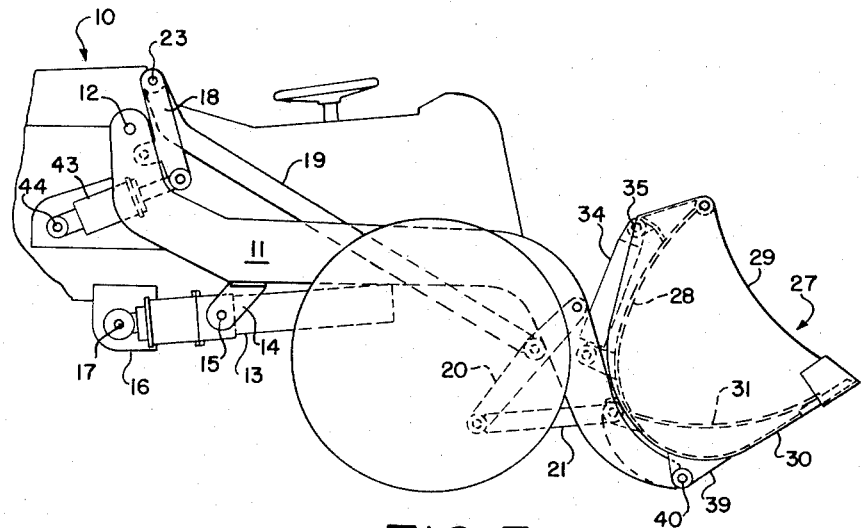
Figure 3 is a partial side plan view of the invention shown in Figure 1 with the bucket in a third operated position.

The present embodiment is the preferred embodiment, but it is to be understood that changes can be made in the present embodiment by one skilled in the art without departing from the spirit and scope of this invention.

For a detailed description of the present invention, reference is made to the drawings. The loader comprises a vehicle 10 of any type well known in the art. Although vehicle 10 as shown in the drawings is a rubber-tired vehicle, a crawler type tractor may also be used.

A boom 11, formed in duplicate portions positioned on each side of the vehicle 10, is pivotally mounted at one end thereof to the vehicle 10 by means of mounting means 12. The other end of the boom 11 is disposed forwardly of the vehicle 10 and is formed to have a somewhat S-shape as can easily be seen in Figure 1. A hydraulic ram 13 is provided for raising and lowering of the boom 11. The cylinder of the hydraulic ram 13 is pivotally mounted to boom 11 through a bracket 14 and pivotal mounting means 15 substantially at the rod end of the cylinder. The rod end of the hydraulic ram 13 is pivotally mounted to the vehicle 10 through a bracket 16 and pivotal mounting means 17. The hydraulic ram 13, the brackets 14 and 16, and the pivotal mounting means 15 and 17 are formed in duplicate portions disposed on each side of the vehicle 10, with the bracket 14 securely mounted to the boom 11 intermediate the ends thereof, and with the bracket 16 rigidly mounted to the vehicle 10.

The linkage means of the present embodiment comprises a lever 18, a link 19, a lever 20, and a link 21, each of which is formed in duplicate portions disposed on each side of the vehicle 10. The lever 18 is provided with an offset pivot point intermediate the ends thereof, and is pivotally mounted at the offset pivot point to the vehicle 10 by means of mounting means 22. The pivotal mounting means 22 is positioned, relative to the vehicle 10, below and forwardly of the pivotal mounting means 12. The upper end of the lever 18 is pivotally mounted to one end of the link 19 by means of pivotal mounting means 23. One end of the lever 20 is pivotally mounted to the boom 11 intermediate the ends thereof by means of mounting means 24. The other end of the link 19 is pivotally mounted to the lever 20 intermediate the ends thereof through pivotal mounting means 25. The other end of the lever 20 is pivotally mounted to one end of the link 21 by means of pivotal mounting means 26.

The bucket of the present invention, as shown in all but Figure 8, is somewhat more complicated than a simple bucket such as those well known in the art, and essentially comprises two elements, a scoop element 27 and an ejector plate 28. The scope element 27 comprises a pair of spaced apart side walls 29 interconnected by a bottom wall 30, a false bottom 31 and a channel element 32. The bottom wall 30 extends from the forward edge of each side wall 29, rearwardly of the side walls to curve upwardly along the rear edges of the side walls 29 to a point substantially at the center thereof, whereat a rearwardly extending horizontal flange is formed. The false bottom 31 is secured between the side walls 29 above the bottom wall 30 and serves to provide an arcuate surface over which the ejector plate 28 may sweep. The channel element 32 is formed in the shape of an inverse V and is secured between the upper marginal edges of the side walls 29. The ejector plate 28 which has a width substantially equal to the distance between the side walls 29 and a length sufficient to cooperate with the upper surface of the false bottom 31, is pivotally mounted at the upper marginal edges of the side walls 29 by means of mounting means 33. The bucket is further provided with a hydraulic ram or motor 34 for pivoting the ejector plate 28 within the scoop element 27. The hydraulic ram or motor 34 may be of any type of double acting hydraulic ram well known in the art. The head end of the hydraulic ram 34 is pivotally mounted to the channel element 32 intermediate the ends thereof by means of mounting means 35. The rod end of the hydraulic ram 34 is pivotally mounted to the rear face of the ejector plate 28 by means of a pair of brackets 36 and pivotal mounting means 37. The pair of brackets 36 are secured to the rear face of the ejector plate 28 near the lower marginal edge of the ejector plate 28. The bucket is further provided with a pair of mounting and reinforcing flanges 38. The pair of flanges 38 are secured to the rear face of the upwardly curved portion of the bottom wall 30 and are disposed in a spaced apart relationship to each other transversely of the bucket. Each flange 38 is provided with a pair of bearings, one substantially at the upper end thereof and the other substantially at the lower end thereof. Two flanges 39 are also provided, and are secured to the rear face of the upwardly curved portion of the bottom wall 30 in cooperation with the lower end of the flanges 38. The forward end of each portion of the boom 11 is pivotally mounted between the flanges 38 and 39 by means of mounting means 40. A second pair of flanges 41 are provided, and are secured to the rear face of the upwardly curved portion of the bottom wall 30, in alignment with the upper end of the flanges 38. The other end of each portion of the link 21 is pivotally mounted between flanges 38 and 41 by means of mounting means 42.

Referring to the bucket as shown in Figure 8, all the parts thereof which are substantially identical to the parts of the previously described bucket are numbered identically. The scoop element 50 is slightly different in the shape of the pair of spaced apart side walls 51. The upper marginal edges of the spaced apart side walls 51 are interconnected by a shaft or rod 52. The shaft 52 is not rotatable relative to the pair of spaced apart side walls 51. The shaft 52 comprises part of a vane type rotary double acting hydraulic motor 56, well known in the art. The van type rotary double acting hydraulic motor 56 further comprises a cylinder 53 which is positioned about the shaft 52 in cooperation therewith. The upper marginal edge of the ejector plate 28 is secured longitudinally of the cylinder 53, and webbing 54 and 55 secured between the cylinder 53 and the rear face of the ejector plate 28, and the cylinder 53 and the front face of the ejector plate 28, respectively, provides a reinforcement between the ejector plate 28 and the cylinder 53.

To operate the linkage means of the present invention to cause the bucket to pivot relative to the boom 11, a hydraulic ram 43 is provided in duplicate portions disposed on each side of the vehicle 10. The head end of the hydraulic ram 43 is pivotally mounted to the vehicle 10 by mounting means 44. The rod end of the hydraulic ram 43 is pivotally mounted to the lower end of the lever 18 by means of mounting means 45. Hydraulic fluid conduits, controls and pump means (not shown) of any type well known in the art may be provided for operation of the hydraulic rams 13, 43 and 34 or 56.

Turning next to a detailed description of the operation of the instant invention, reference is again made to the drawings. The various operations using a bucket as shown in Figure 8 need not be described since a description of the invention using the bucket as shown in the other figures will suffice. As shown in Figure 1, the subject loader is positioned to dig material at ground level. The vehicle 10, as shown in Figure 1, is moved against the material to fill the bucket, and the hydraulic ram 43 is then extended by the operator of the loader. This causes a pivoting of the lever 18 about pivotal mounting means 22 in a counterclocokwise direction as viewed in Figure 1, to in turn cause a clockwise movement of the lever 20 about pivotal mounting means 24 as viewed in Figure 1, through the link 19. The link 21 will then operated upon the bucket to cause a counterclockwise pivoting of the bucket about pivotal mounting means 40. The loader will then have assumed the position shown in Figure 3, and the vehicle 10 may then be moved to carry the load to any remote position for dumping. The geometry of the boom and linkage means of the present embodiment permits digging with the shovel below ground level. To accomplish this the hydraulic ram 43 is completely contracted as shown in Figure 4. The lever 18 is then moved clockwise, the lever 20 is moved counterclockwise by the link 19, and the bucket is moved clockwise by the link 21, as viewed in Figure 4, to position the bucket for digging below ground level. The vehicle 10 is then moved toward the material to be dug to fill the bucket, and the hydraulic ram 43 is then extended to raise the bucket to the carrying position as shown in Figure 3.

Figure 4:
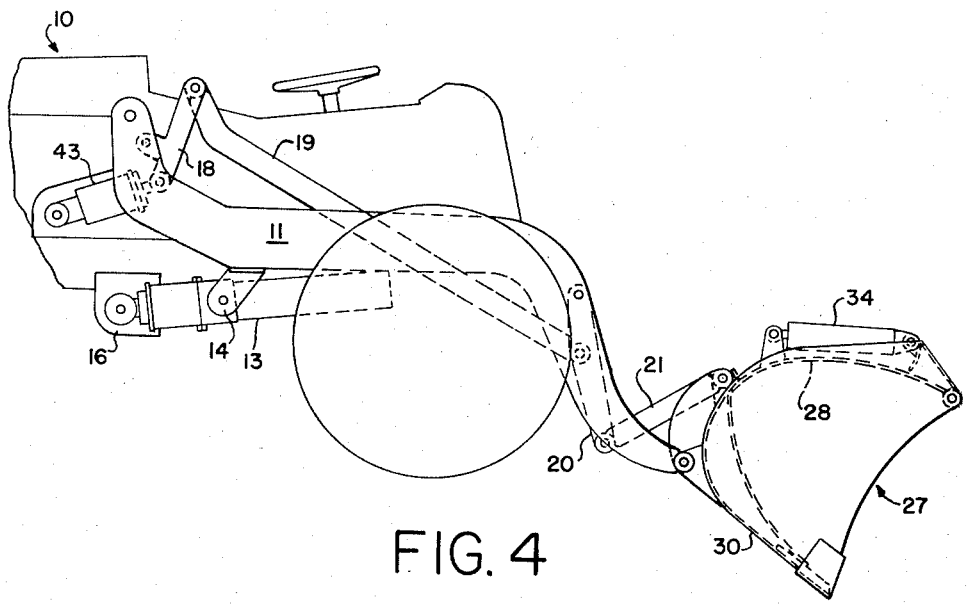
Figure 4 is a side plan view of the structure shown in Figure 1 with the bucket in a dig position below ground level.
Figure 5:
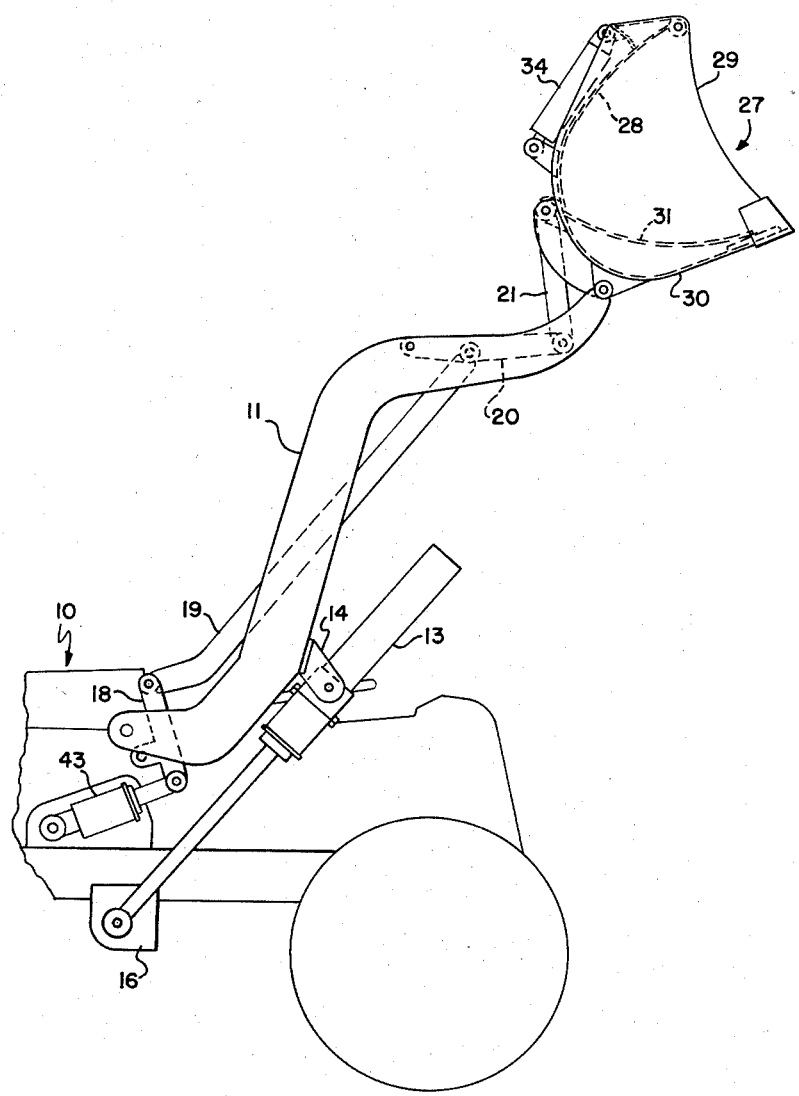
Figure 5 is a partial side plan view of the structure shown in Figure 1 with the boom and linkage means raised to a high lift position, the bucket in one operated position.

From the position shown in Figure 3, the bucket may be raised to a high lift carrying position by an expansion of hydraulic ram 13, as shown in Figure 5. From this position, and without any reduction in dumping height or reach, any materials may be efficiently and effectively dumped from the bucket by an expansion of the hydraulic ram or motor 34. The extension of the hydraulic ram 34 will cause the ejector plate 28 to sweep the scoop 27 to dump the material. It is obvious from this description that the phrase "any materials" includes sticky materials which would tend to adhere to the walls of the bucket, since the ejector plate 28 will sweep the sticky materials from the bucket. It is further obvious that the present embodiment permits dumping of the bucket into a bin or truck wherein the height of the bin or truck is substantially equal to the distance from the ground to the bottom wall 30 of the scoop element.

Figure 6:
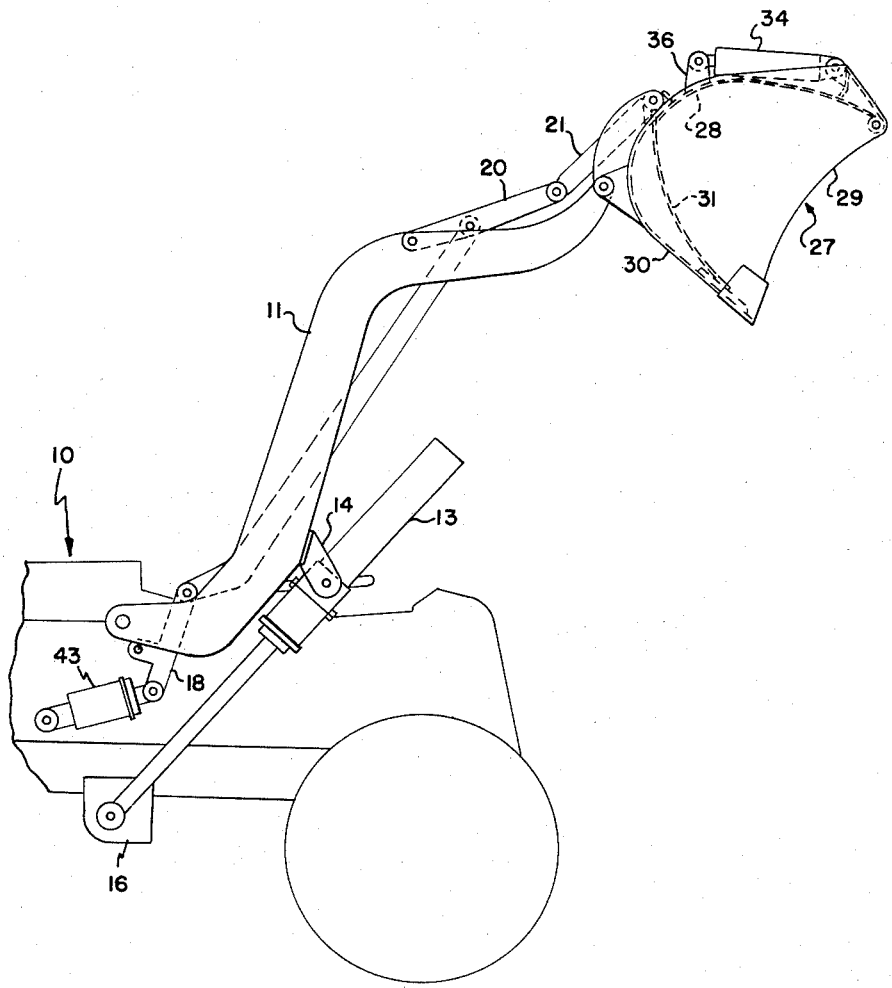
Figures 6 and 7 are partial side plan views of the structure shown in Figure 5, showing the bucket in other operated positions.

The bucket may also be dumped from the position shown in Figure 5, by a retraction of the ram 43 rather than an extension of the ram 34. This will cause a forward tipping of the bucket about pivotal mounting means 40 to dump the bucket as shown in Figure 6.

Figure 7:
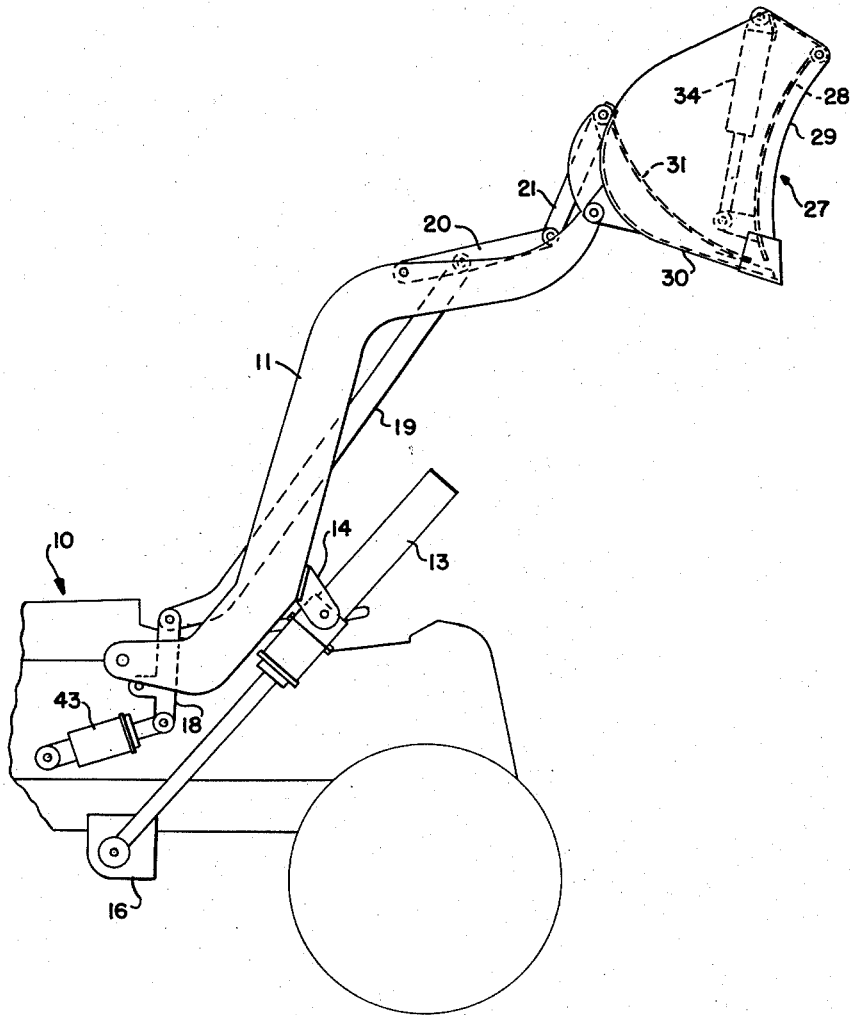
Figure 10:
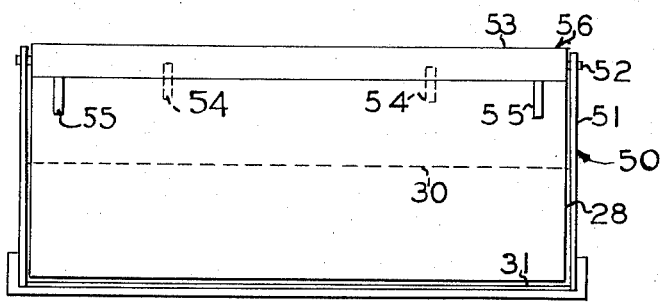
Figure 10 is a front plan view of the bucket shown in Figure 8.
Figure 9:
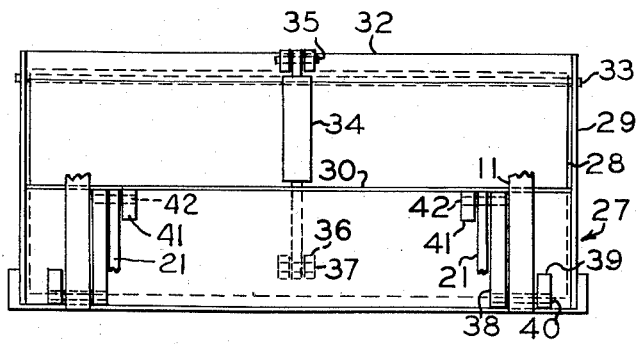
Figure 9 is a rear plan view of the bucket shown in Figure 2.

Further, any combination of the above described methods for dumping may be used for any special circumstances. Figure 7 shows one example thereof, wherein the hydraulic ram 34 has been extended to cause the ejector plate 28 to sweep the scoop element 27, and the hydraulic ram 43 has been partially contracted to pivot the bucket about the pivotal mounting means 40 a certain selected amount.

The subject loader may be efficiently used as a bulldozer by positioning the boom 11 and the linkage means as shown in Figure 1, and by expanding the ram 34 to move the ejector plate 28 to a position such as shown in Figure 2. The ejector plate 28 and the forward marginal edges of the scoop 27 will then present a conventional bulldozer blade to any material to be bulldozed.

The loader may be efficiently used for the spreading of any material by gradually dumping the material as the vehicle 10 is moved. This may be accomplished by extending the hydraulic ram 34 any desired amount, or by retracting the hydraulic ram 43 any desired amount, or by some combination of both. Dumped material may be spread by using the subject loader as described for the bulldozing function.

The subject loader may be efficiently used to backfill an excavation by moving the vehicle 10 with the bucket loaded, and positioned to any degree between that shown in Figures 3 and 4, to the edge of an excavation. As the hydraulic ram 34 is then extended from the positions shown in Figures 3 and 4 to that shown in Figure 2, the material will be dumped from the bucket into the excavation to accurately backfill the excavation.

It must be noted that it is apparent from the above description of the operation of the loader that the loader may be operated to perform any of the above described functions with any degree of operation of the hydraulic ram 13.

Having described the invention, what is considered new and desired to be protected by Letters Patent is:

1. In a loader, a bucket comprising a substantially U-shaped scoop element comprising a pair of side walls interconnected by a bottom wall and having a cutting edge on one side thereof along the bottom edge thereof, an ejector plate pivotally mounted within said scoop element, and means pivotally mounted between said scoop element and said ejector plate for pivoting said ejector plate relative to said scoop element, said scoop element and said ejector plate being formed so that said ejector plate is substantially contiguous with the marginal edges of said side walls and said bottom wall on the side of said scoop element having said cutting edge in one extreme pivoted position of said ejector plate.

2. In a loader, a bucket comprising a scoop element having a pair of side walls interconnected by a bottom wall, one marginal edge of said bottom wall having a cutting edge mounted thereon, a curved false bottom mounted between said side walls above said bottom wall, an ejector plate, and means mounted between said scoop element and said ejector plate and operable to pivot said ejector plate relative to said scoop element, said scoop element and said ejector plate being formed so that said ejector plate is substantially contiguous with the marginal edges of the side walls and bottom wall of the side of said scoop element having said cutting edge in one extreme pivoted position of said ejector plate, said curved false bottom having a curvature substantially equal to that traced by the lower marginal edge of said ejector plate.

3. In a loader, a bucket comprising a scoop element having a pair of side walls interconnected by a bottom wall, a cutting edge mounted along one marginal edge of said bottom wall, a curved false bottom mounted between said side walls above said bottom wall, and ejector plate, means pivotally mounting said ejector plate within said scoop element, said curved false bottom having a curvature substantially equal to that traced by the lower marginal edge of said ejector plate, and means pivotally mounted between said scoop element and said ejector plate for pivoting said ejector plate relative to said scoop element, said scoop element and said ejector plate being formed so that said ejector plate is substantially contiguous with the marginal edges of said side walls and said bottom wall on the side of said scoop having said cutting edge in one extreme pivoted position of said ejector plate.

4. In a loader, a bucket comprising a scoop element, said scoop element comprising a pair of spaced apart side walls, a bottom and partial back wall secured to the lower and rear marginal edges of said side walls, an ejector plate, and means mounted between said ejector plate and said side walls and operable to pivot said ejector plate relative to said scoop element, said scoop element and said ejector plate being formed so that said ejector plate is substantially contiguous with the forward marginal edges of said side walls and said bottom wall in the extreme forward pivoted position of said ejector plate.

5. In a loader, a bucket comprising a scoop element, said scoop element comprising a pair of spaced apart side walls, a bottom wall and partial back wall secured to the lower and rear marginal edges of said side walls, a curved false bottom secured between said side walls above said bottom and partial back wall, an ejector plate, and means mounted between said side walls and said ejector plate and operable to pivot said ejector plate relative to said scoop element, said scoop element and said ejector plate being formed so that said ejector plate is substantially contiguous with the forward marginal edges of said side walls and said bottom wall in the extreme forward pivoted position of said ejector plate, said curved false bottom having a curvature substantially equal to that traced by the lower marginal edge of said ejector plate.

6. In a loader, a bucket comprising a scoop element, said scoop element comprising a pair of spaced apart side walls, a bottom and partial back wall secured to the lower and rear marginal edges of said side walls, a curved false bottom secured between said side walls above said bottom and partial back wall, an ejector plate having a width substantially equal to the distance between said side walls, and means mounted between said side walls and said ejector plate and operable to pivot said ejector plate relative to said scoop element, said scoop element and said ejector plate being formed so that said ejector plate is substantially contiguous with the forward marginal edges of said side walls and said bottom wall in the extreme forward pivoted position of said ejector plate, said curved false bottom having a curvature substantially equal to that traced by the lower marginal edge of said ejector plate.

7. In a loader having a vehicle, a boom pivotally mountable at one end thereof on said vehicle, linkage means pivotally mountable at one end thereof on said vehicle, a bucket comprising a substantially U-shaped scoop element, an ejector plate, the other ends of said link means and said boom pivotally mounted to said scoop element, and means mounted between said scoop element and said ejector plate and operable to pivot said ejector plate relative to said scoop element, said scoop element and said ejector plate being formed so that said ejector plate is substantially contiguous with the forward marginal edges of said scoop element in the extreme forward pivoted position of said ejector plate whereby said bucket can function as a conventional bulldozer blade.

8. In a loader having a vehicle, a boom pivotally mountable at one end thereof on said vehicle, linkage means pivotally mountable at one end thereof on said vehicle, a bucket comprising a substantially U-shaped scoop element, an ejector plate pivotally mounted within said scoop element, the other ends of said link means and said boom pivotally mounted to said scoop element, and means pivotally mounted between said scoop element and said ejector plate for pivoting said ejector plate relative to said scoop element, said scoop element and said ejector plate being formed so that said ejector plate is substantially contiguous with the forward marginal edges of said scoop element in the extreme forward pivoted position of said ejector plate whereby said bucket can function as a conventional bulldozer blade.

9. In a loader having a vehicle, a boom pivotally mountable at one end thereof on said vehicle, link means pivotally mountable at one end thereof on said vehicle, a bucket comprising a scoop element having a pair of side walls interconnected by a bottom wall, a curved false bottom mounted between said side walls above said bottom wall, an ejector plate, means mounted between said scoop element and said ejector plate and operable to pivot said ejector plate relative to said scoop element, said scoop element and said ejector plate being formed so that said ejector plate is substantially contiguous with the forward marginal edges of said side walls and said bottom wall in the extreme forward pivoted position of said ejector plate so that said bucket can function as a conventional bulldozer blade, said curved false bottom having a curvature substantially equal to that traced by the lower marginal edge of said ejector plate, and the other ends of said link means and said boom pivotally mounted to said scoop element.

10. In a loader having a vehicle, a boom pivotally mountable at one end thereof on said vehicle, link means pivotally mountable at one end thereof on said vehicle, a bucket comprising a scoop element having a pair of side walls interconnected by a bottom wall, a curved false bottom mounted between said side walls above said bottom wall, an ejector plate, means pivotally mounting said ejector plate within said scoop element, said curved false bottom having a curvature substantially equal to that traced by the lower marginal edge of said ejector plate, the other ends of said link means and said boom pivotally mounted to said scoop element, and means pivotally mounted between said scoop element and said ejector plate for pivoting said ejector plate relative to said scoop element, said scoop element and said ejector plate being formed so that said ejector plate is substantially contiguous with the forward marginal edges of said side walls and said bottom wall of said scoop element in the extreme forward pivoted position of said ejector plate whereby said bucket can function as a bulldozer blade.

11. In a loader having a vehicle, a boom pivotally mountable at one end thereof on said vehicle, link means comprising a lever pivotally mountable on said vehicle, a second lever pivotally mounted on said boom, a link pivotally mounted between said levers, a second link pivotally mounted to said second lever, means pivotally mountable between said vehicle and said first lever for pivoting said first lever relative to said vehicle and said second lever relative to said boom, a bucket comprising a scoop element having a cutting edge on one side thereof along the bottom edge thereof, an ejector plate, and means mounted between said scoop element and said ejector plate and operable to pivot said ejector plate relative to said scoop element, said scoop element and said ejector plate being formed so that said ejector plate is substantially contiguous with the forward marginal edge of the side of said scoop element having said cutting edge in one extreme pivoted position of said ejector plate whereby said bucket can function as a bulldozer blade, said second link and said boom pivotally mounted to said scoop element.

12. In a loader having a vehicle, a boom pivotally mountable at one end thereof on said vehicle, link means comprising a lever pivotally mountable on said vehicle, a second lever pivotally mounted on said boom, a link pivotally mounted between said levers, a second link pivotally mounted to said second lever, means pivotally mountable between said vehicle and said first lever for pivoting said first lever relative to said vehicle and said second lever relative to said boom, a bucket comprising a scoop element having a cutting edge on one side thereof along the bottom edge thereof, an ejector plate pivotally mounted within said scoop element, said second link and said boom pivotally mounted to said scoop element, and means pivotally mounted between said scoop element and said ejector plate for pivoting said ejector plate relative to said scoop element, said scoop element and said ejector plate being formed so that said ejector plate is substantially contiguous with the marginal edge of the side of said scoop element having said cutting edge in one extreme pivoted position of said ejector plate so that said bucket can function as a bulldozer blade.

13. In a loader having a vehicle, a boom pivotally mountable at one end thereof on said vehicle, link means pivotally mountable at one end thereof on said vehicle, a bucket comprising a scoop element having a pair of spaced apart side walls, a bottom and partial back wall secured to the lower and rear marginal edges of said side walls, an ejector plate, and a double acting hydraulic motor mounted between said side walls and said ejector plate for pivoting said ejector plate relative to said scoop element, the other ends of said link means and said boom pivotally mounted to said scoop element, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

14. In a loader having a vehicle, a boom pivotally mountable at one end thereof on said vehicle, link means pivotally mountable at one end thereof on said vehicle, a bucket comprising a scoop element having a pair of spaced apart side walls, a bottom and partial back wall secured to the lower and rear marginal edges of said side walls, a channel element secured between the upper marginal edges of said side walls, an ejector plate pivotally mounted within said scoop element, the other ends of said link means and said boom pivotally mounted to said scoop element, and a double acting hydraulic ram pivotally mounted between said channel element and said ejector plate for pivoting said ejector plate relative to said scoop element, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

15. In a loader having a vehicle, a boom pivotally mountable at one end thereof on said vehicle, link means comprising a lever pivotally mountable intermediate the ends thereof on said vehicle, a second lever pivotally mounted at one end thereof on said boom, a link pivotally mounted at one end thereof to one end of said first lever and pivotally mounted at the other end thereof to said second lever intermediate the ends thereof, a second link pivotally mounted at one end thereof to the other end of said second lever, means pivotally mountable between said vehicle and the other end of said first lever for pivoting said first lever relative to said vehicle and said second lever relative to said boom, a bucket comprising a scoop element, said scoop element comprising a pair of spaced apart side walls, a bottom and partial back wall secured to the lower and rear marginal edges of said side walls, an ejector plate, and means mounted between said side walls and said ejector plate and operable to pivot said ejector plate relative to said scoop element, said bucket pivotally mounted to the other end of said second link and the other end of said boom, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

16. In a loader having a vehicle, a boom pivotally mountable at one end thereof on said vehicle, link means comprising a lever pivotally mountable intermediate the ends thereof on said vehicle, a second lever pivotally mounted at one end thereof on said boom, a link pivotally mounted at one end thereof to one end of said first lever and pivotally mounted at the other end thereof to said second lever intermediate the ends thereof, a second link pivotally mounted at one end thereof to the other end of said second lever, means pivotally mountable between said vehicle and the other end of said first lever for pivoting said first lever relative to said vehicle and said second lever relative to said boom, a bucket comprising a scoop element, said scoop element comprising a pair of spaced apart side walls, a bottom and partial back wall secured to the lower and rear marginal edges of said side walls, and a channel element secured between the upper marginal edges of said side walls, an ejector plate pivotally mounted within said scoop element, said bucket pivotally mounted to the other end of said second link and the other end of said boom, and means pivotally mounted between said channel element and said ejector plate for pivoting said ejector plate relative to said scoop element, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

17. In a loader having a vehicle, a boom pivotally mountable at one end thereof on said vehicle, link means comprising a first lever pivotally mountable intermediate the ends thereof on said vehicle, a second lever pivotally mounted at one end thereof on said boom intermediate the ends thereof, a first link pivotally mounted between one end of said first lever and said second lever intermediate the ends thereof, a second link pivotally mounted at one end thereof to the other end of said second lever, means pivotally mountable between said vehicle and the other end of said first lever for pivoting said first lever relative to said vehicle and said second lever relative to said boom, a bucket comprising a scoop element, said scoop element comprising a pair of spaced apart side walls, a bottom and partial back wall secured to the lower and rear marginal edges of said side walls, an ejector plate, means mounted between said side walls and said ejector plate and operable to pivot said ejector plate relative to said scoop element, and means pivotally mounting the other end of said second link and the other end of said boom to the rear face of said partial back wall, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

18. In a loader having a vehicle, a boom pivotally mountable at one end thereof on said vehicle, link means comprising a first lever pivotally mountable intermediate the ends thereof on said vehicle, a second lever pivotally mounted at one end thereof on said boom intermediate the ends thereof, a first link pivotally mounted between one end of said first lever and said second lever intermediate the ends thereof, a second link pivotally mounted at one end thereof to the other end of said second lever, means pivotally mountable between said vehicle and the other end of said first lever for pivoting said first lever relative to said vehicle and said second lever relative to said boom, a bucket comprising a scoop element, said scoop element comprising a pair of spaced apart side walls, a bottom and partial back wall secured to the lower and rear marginal edges of said side walls, and a channel element secured between the upper marginal edges of said side walls, an ejector plate pivotally mounted within said scoop element, means pivotally mounting the other end of said second link and the other end of said boom to the rear face of said partial back wall, and means pivotally mounted between said channel element and said ejector plate for pivoting said ejector plate relative to said scoop element, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

19. In a loader having a vehicle, a boom pivotally mountable at one end thereof on said vehicle, link means comprising a first lever pivotally mountable intermediate the ends thereof on said vehicle, a second lever pivotally mounted at one end thereof on said boom intermediate the ends thereof, a first link pivotally mounted between one end of said first lever and said second lever intermediate the ends thereof, a second link pivotally mounted at one end thereof to the other end of said second lever, means pivotally mountable between said vehicle and the other end of said first lever for pivoting said first lever relative to said vehicle and said second lever relative to said boom, a bucket comprising a scoop element, said scoop element comprising a pair of spaced apart side walls, a bottom wall and a partial rear wall secured to the lower and rear marginal edges of said side walls, an ejector plate, a double acting hydraulic motor mounted between said side walls and said ejector plate for pivoting said ejector plate relative to said scoop element, means pivotally mounting the other end of said second link to the upper rear marginal edge of said rear wall, and means pivotally mounting the other end of said boom to the lower and rear marginal edge of said rear wall, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

20. In a loader having a vehicle, a boom pivotally mountable at one end thereof on said vehicle, link means comprising a first lever pivotally mountable intermediate the ends thereof on said vehicle, a second lever pivotally mounted at one end thereof on said boom intermediate the ends thereof, a first link pivotally mounted between one end of said first lever and said second lever intermediate the ends thereof, a second link pivotally mounted at one end thereof to the other end of said second lever, a hydraulic ram pivotally mountable at one end thereof on said vehicle and pivotally mounted at the other end thereof to the other end of said first lever for pivoting said first lever relative to said vehicle and said second lever relative to said boom, a bucket comprising a scoop element, said scoop element comprising a pair of spaced apart side walls, a bottom wall and a partial rear wall secured to the lower and rear marginal edges of said side walls, and a channel element secured between the upper marginal edges of said side walls, an ejector plate pivotally mounted within said scoop element, means pivotally mounting the other end of said second link to the upper rear marginal edge of said rear wall, means pivotally mounting the other end of said boom to the lower rear marginal edge of said rear wall, and a double acting hydraulic ram pivotally mounted between said channel element and said ejector plate for pivoting said ejector plate relative to said scoop element, said scoop element and said ejector plate being formed so that said ejector plate is substantially contiguous with the forward marginal edges of said side walls and bottom wall of said scoop element in the extreme forward pivoted position of said ejector plate so that said bucket can function as a bulldozer blade.

21. A loader comprising a vehicle, a boom pivotally mounted on said vehicle, link means comprising a lever pivotally mounted on said vehicle, a second lever pivotally mounted on said boom, a link pivotally mounted between said levers, a second link pivotally mounted to said second lever, means pivotally mounted between said vehicle and said boom for raising and lowering said boom, means pivotally mounted between said vehicle and said first lever for pivoting said first lever relative to said vehicle and said second lever relative to said boom, a bucket comprising a scoop element having a cutting edge on one side thereof along the bottom edge thereof, an ejector plate, and means mounted between said scoop element and said ejector plate and operable to pivot said ejector plate relative to said scoop element, said second link and said boom pivotally mounted to said scoop element, said scoop element and said ejector plate being formed so that said ejector plate is substantially contiguous with the marginal edge of the side of said scoop element having said cutting edge in one extreme pivoted position of said ejector plate so that said bucket can function as a bulldozer blade.

22. A loader comprising a vehicle, a boom pivotally mounted on said vehicle, link means comprising a lever pivotally mounted on said vehicle, a second lever pivotally mounted on said boom, a link pivotally mounted between said levers, a second link pivotally mounted to said second lever, means pivotally mounted between said vehicle and said boom for raising and lowering said boom, means pivotally mounted between said vehicle and said first lever for pivoting said first lever relative to said vehicle and said second lever relative to said boom, a bucket comprising a scoop element having a cutting edge on one side thereof along the bottom edge thereof, an ejector plate pivotally mounted within said scoop element, said second link and said boom pivotally mounted to said scoop element, and means pivotally mounted between said scoop element and said ejector plate for pivoting said ejector plate relative to said scoop element, said scoop element and said ejector plate being formed so that said ejector plate is substantially contiguous with the marginal edge of the side of said scoop element having said cutting edge in one extreme pivoted position of said ejector plate so that said bucket can function as a bulldozer blade.

23. A loader comprising a vehicle, a boom pivotally mounted at one end thereof on said vehicle and extending forwardly thereof, means pivotally mounted between said vehicle and said boom intermediate the ends thereof for raising and lowering said boom, link means pivotally mounted at one end thereof on said vehicle and intermediate said ends thereof on said boom intermediate said ends thereof, means mounted between said vehicle and said link means for pivoting said link means relative to said vehicle and for pivoting the other end of said link means relative to said boom, a bucket comprising a scoop element having a cutting edge on one side thereof along the bottom edge thereof, an ejector plate, a rotary vane type double acting hydraulic motor mounted between said scoop element and said ejector plate for pivoting said ejector plate relative to said scoop element, and means pivotally mounting said other end of said link means and the forward end of said boom to said scoop element, said scoop element and said ejector plate being formed so that said ejector plate is substantially contiguous with the marginal edge of the side of said scoop element having said cutting edge in one extreme pivoted position of said ejector plate so that said bucket can function as a bulldozer blade.

24. A loader comprising a vehicle, a boom pivotally mounted at one end thereof on said vehicle and extending forwardly thereof, means pivotally mounted between said vehicle and said boom intermediate the ends thereof for raising and lowering said boom, link means pivotally mounted at one end thereof on said vehicle and intermediate said ends thereof on said boom intermediate said ends thereof, means mounted between said vehicle and said link means for pivoting said link means relative to said vehicle and for pivoting the other end of said link means relative to said boom, a bucket comprising a scoop element having a cutting edge on one side thereof along the bottom edge thereof, an ejector plate pivotally mounted within said scoop element, means pivotally mounting said other end of said link means for the forward end of said boom to said scoop element, and means pivotally mounted between said scoop element and said ejector plate for pivoting said ejector plate relative to said scoop element, said scoop element and said ejector plate being formed so that said ejector plate is substantially contiguous with the marginal edge of the side of said scoop element having said cutting edge in one extreme pivoted position of said ejector plate so that said bucket can function as a bulldozer blade.

25. A loader comprising a vehicle, a boom pivotally mounted at one end thereof on said vehicle and extending forwardly of said vehicle, a hydraulic ram for raising and lowering said boom, means pivotally mounting the cylinder of said hydraulic ram intermediate the ends thereof to said boom intermediate the ends thereof, means pivotally mounting the rod end of said hydraulic ram to said vehicle, link means comprising a first lever pivotally mounted intermediate the ends thereof on said vehicle below and forwardly of the boom pivotal mounting, a second lever pivotally mounted at one end thereof on said boom intermediate the ends thereof, a first link pivotally mounted between one end of said first lever and said second lever intermediate the ends thereof, a second link pivotally mounted at one end thereof to the other end of said second lever, a second hydraulic ram, means pivotally mounting the head end of said second hydraulic ram on said vehicle, means pivotally mounting the rod end of said second hydraulic ram to the other end of said first lever, a bucket comprising a scoop element, said scoop element comprising a pair of spaced apart side walls, a bottom and partial back wall secured to the lower and rear marginal edges of said side walls, and a channel element secured between the upper marginal edges of said side walls, an ejector plate pivotally mounted within said scoop element, means pivotally mounting the other end of said second link to the upper rear face of said partial back wall, means pivotally mounting the forward end of said boom to the lower rear face of said partial back wall, and a double acting hydraulic ram pivotally mounted between said channel element and said ejector plate for pivoting said ejector plate relative to said scoop element, said scoop element and said ejector plate being formed so that said ejector plate is substantially contiguous with the forward marginal edges of said side walls and said bottom wall of said scoop element in the extreme forward pivoted position of said ejector plate so that said bucket can function as a bulldozer blade.

References Cited in the file of this patent
UNITED STATES PATENTS

| | | |
|---|---|---|
| 2,269,502 | Wilson et al. | Jan. 13, 1942 |
| 2,503,522 | Struthers et al. | Apr. 11, 1950 |
| 2,603,374 | McNamara | July 15, 1952 |
| 2,742,165 | Pilch | Apr. 17, 1956 |